United States Patent [19]

Clayton et al.

[11] Patent Number: 5,072,367

[45] Date of Patent: Dec. 10, 1991

[54] SYSTEM USING TWO PASSES SEARCHING TO LOCATE RECORD HAVING ONLY PARAMETERS AND CORRESPONDING VALUES OF AN INPUT RECORD

[75] Inventors: Neil H. Clayton, Apalachin, N.Y.; Jose L. Rivero, Boca Raton, Fla.; Kuo-chang Sun, Endicott, N.Y.

[73] Assignee: International Business Machines Corporation, Armonk, N.Y.

[21] Appl. No.: 512,022

[22] Filed: Apr. 16, 1990

Related U.S. Application Data

[63] Continuation of Ser. No. 103,809, Oct. 1, 1987, abandoned.

[51] Int. Cl.$^5$ ............................................. G06F 15/40
[52] U.S. Cl. .................................. 395/600; 340/282.1; 340/283.1; 340/259.4; 340/146.2; 364/DIG. 1
[58] Field of Search ... 364/200 MS File, 900 MS File; 340/146.2

[56] References Cited

U.S. PATENT DOCUMENTS

| | | | |
|---|---|---|---|
| T900,006 | 7/1972 | Perriens et al. | 364/300 |
| 3,350,695 | 10/1967 | Kaufman et al. | 364/900 |
| 3,409,882 | 11/1968 | Sweet et al. | 364/900 |
| 3,568,155 | 3/1971 | Abraham et al. | 364/200 |
| 3,568,156 | 3/1971 | Thompson | 364/200 |
| 3,906,455 | 9/1975 | Houston et al. | 364/200 |
| 3,947,825 | 3/1976 | Cassada | 364/900 |
| 4,128,891 | 12/1978 | Lin et al. | 364/900 |
| 4,209,845 | 6/1980 | Berger et al. | 364/900 |
| 4,221,003 | 9/1980 | Chang et al. | 364/900 |
| 4,591,983 | 5/1986 | Bennet | 364/403 |
| 4,606,002 | 8/1986 | Waisman et al. | 364/200 |
| 4,636,974 | 1/1987 | Griffin | 364/900 |
| 4,644,471 | 2/1987 | Kojima et al. | 364/300 |
| 4,648,044 | 3/1987 | Hardy et al. | 364/513 |
| 4,658,370 | 4/1987 | Erman et al. | 364/513 |
| 4,675,829 | 6/1987 | Clemenson | 364/513 |
| 4,677,550 | 6/1987 | Ferguson | 364/300 |
| 4,748,439 | 5/1988 | Robinson et al. | 364/900 X |
| 4,817,036 | 3/1989 | Millett et al. | 364/900 |

OTHER PUBLICATIONS

IBM Technical Disclosure Bulletin, vol. 24, No. 7A, Dec. 1981, "Accomodation of Variable-Length Records In A Collection of Bubble Chips," by H. Chang.
IBM Technical Disclosure Bulletin, vol. 28, No. 8, Jan. 1986, "Method For Transferring Collected Data Between Rulebases of Expert Systems", by Benignus et al.
IBM Technical Disclosure Bulletin, vol. 29, No. 10, Mar. 1987, "Predictive Search Mechanism", by K. S. Natarajan.
IBM Technical Disclosure Bulletin, vol. 27, No. 12, May 1985, "Invoking Inference Engines In An Expert System", by Aikins et al.
IBM Technical Disclosure Bulletin, vol. 16, No. 12, May 1974, "Retrieval Ugorithm For Relational Data Bases".
The Office, vol. 104, No. 5 (1986), p. 116.
"Managing the Records of a Nuclear Utility", The First Conference on Artificial Intelligence Applications (1984), pp. 86-91, An Expert System for Evaluating Electronic Warfare Tasking Plans For the Royal Navy, by J. A. Gadsden.
IEEE Transactions on Software Engineering, vol. SE-11, No. 7, Jul. 1985, "Gambit: An Interactive Database Design Tool for Data Structures, Integrity Constraints, and Transactions", by Braegger et al.

*Primary Examiner*—Thomas C. Lee
*Attorney, Agent, or Firm*—Scully, Scott, Murphy & Presser

[57] ABSTRACT

A new database table obtained by transferring records from a conventional database table. Each database table has a pluralilty of rows and columns, and each record includes a plurality of data items. Each data item in the conventional table is transferred to a first column of the new database, and a second column of the new table identifies the columns of the conventional table from which the data items in the first column of the new table were taken. A third column of the new table identifies the records of the conventional table from which the data items in the first column of the new tables were taken. A method and system are also disclosed for searching the new database table for a given record.

9 Claims, 7 Drawing Sheets

SYSTEM USING TWO PASSES SEARCHING TO LOCATE RECORD HAVING ONLY PARAMETERS AND CORRESPONDING VALUES OF AN INPUT RECORD

This application is a continuation, of application Ser. No. 103,809, filed Oct. 1, 1987 now abandoned.

BACKGROUND OF THE INVENTION

This invention generally relates to database table designs and to a method of searching a database table for a given record; and more particularly, the invention relates to a database table design and to a method of searching a database table that are especially well-suited to complement solution searching on a knowledge system involving large numbers of variables.

Knowledge systems are computer systems that emulate human reasoning by interpreting encoded knowledge of human experts stored in a database referred to as a knowledge base. If the domain of the knowledge base, or the scope of the problem, is sufficiently narrow and an adequately large body of knowledge is properly coded in the knowledge base, then the knowledge system can achieve performance matching or exceeding the ability of a human expert. In such a case, the knowledge system is referred to as an expert system. Expert systems may be designed, at least in theory, for virtually any application ranging from medical diagnosis, automobile repair consultation, inventory control, and many other uses.

One difficulty with expert systems is that, for many specific queries, they are more expensive and slower than necessary. To elaborate, an expert system may be invoked to answer a request involving a large number of variables, and the expert system may process those variables through a relatively complicated program to answer the request. For many requests, especially those that are unique or complicated, this processing may be needed to answer the requests reliably. However, many requests are relatively standard or conventional, and invoking the complicated, time consuming processing of the expert system is a relatively slow and expensive way to answer these requests.

For instance, a customer may purchase an IBM 9370 computer system with many variable or optional features such as different memory sizes, different numbers of tape drives, and different direct access storage devices. In fact, it has been estimated that over two billion different combinations of features are available with the 9370 Information System. This very large number of different configurations of the 9370 Information System precludes developing a data base that contains all valid configurations—that is, all configurations that can be built without violating any of certain rules or limitations set by the manufacturer.

To solve this problem, an expert system was developed to configure a complete system based on a customer's requested machine configuration. The resultant expert system configurator adds features that are implied by the features that the customer actually specified as part of the requested machine configuration. For example, the expert system configurator adds enough DASD/Tape Controller Cards to control the number of DASD devices and Tape devices specified by the customer. The configurator also adds enough racks to physically contain the processor, the DASD devices, and the tape devices. To perform its function, the configurator actually determines where to place each card in a card cage and determines where to place each box in a rack. This is necessary in order to determine how many card cages are necessary and how many racks are necessary. The configurator also checks the resultant fully configured system against upper limits, to be sure that the system can be manufactured.

Various 9370 systems have become somewhat standard or common, though, and considerable time and expense could be saved if the expert system were supplemented to avoid invoking that expert system to process a request for one of those standard or conventional systems.

One way to do this is to provide the expert system with a conventional complementary database having a table that stores a plurality of records of available systems, and to preprocess a request from a user by searching the complementary database for a record identical to the record of the request. If an identical record is found in the complementary database table, this indicates that the requested configuration is valid; however, if no identical record is found in the complementary database, the expert system is invoked to answer the request.

Conventionally, database tables consist of a series of rows and columns. Each row has a fixed length and holds the data items for a respective one record, and each column of the database is dedicated to holding values for a respective one parameter of a family of parameters. The number of columns in tables that can be defined by conventional database management systems is limited, however, and such database tables are not capable of accommodating the request records of some expert systems involving a large family of parameters.

SUMMARY OF THE INVENTION

An object of this invention is to improve database table designs and techniques for searching through a database table.

Another object of the present invention is to provide a database table especially well suited to complement solution searching on an expert system.

A further object of this invention is to provide a database table structure that will accommodate a table definition of a variable number of columns to any degree.

These and other objectives are achieved with a unique database table obtained by transferring data from a conventional database table. The conventional database table has a plurality of rows and columns, and this database table holds a plurality of records each of which includes a plurality of data items hold in columns of the conventional table. The new database table obtained by the present invention has a plurality of rows and at least three, and preferably four, columns; and the columns of this table are designated "Record Number," "Column Name," "Data Type," and "Value." Data value transfer means is provided to transfer each data item in the conventional table to the Value column of the new table; and column identification means is provided to identify in the Column Name column of each row of the new table a title, name, or other identifying indicia of the column of the conventional table from which the data item in the Value column of that row was taken. Record identification means is provided to identify in the record number column of each row of the new table, a number or other identifying indicia of the record of the conventional table from which the data item in the Value column of that row of the new table was taken.

A method is also provided for searching the new database table for a given record including a plurality of parameters and a respective value for each of these parameters. This method comprises the steps of searching the database table for, and storing in a memory list, the numbers of the records having a first of the parameters of the given record and the same value for that first parameter as in the given record. The method further includes the step of, for each of the other parameters of the given record, deleting from the memory list, (1), the numbers of the records not having the other parameter, and (2), the numbers of the records having the other parameter but having a value for that other parameter different than the value for the other parameter in the given record. The method further comprises the step of searching the records listed in the memory list for a record having only the parameters in the given record, and when such a record is found, identifying such record as identical to the given record.

Further benefits and advantages of the invention will become apparent from a consideration of the following detailed description given with reference to the accompanying drawings, which specify and show preferred embodiments of the invention.

DETAILED DESCRIPTION OF THE PREFERRED EMBODIMENTS

Figure 1:
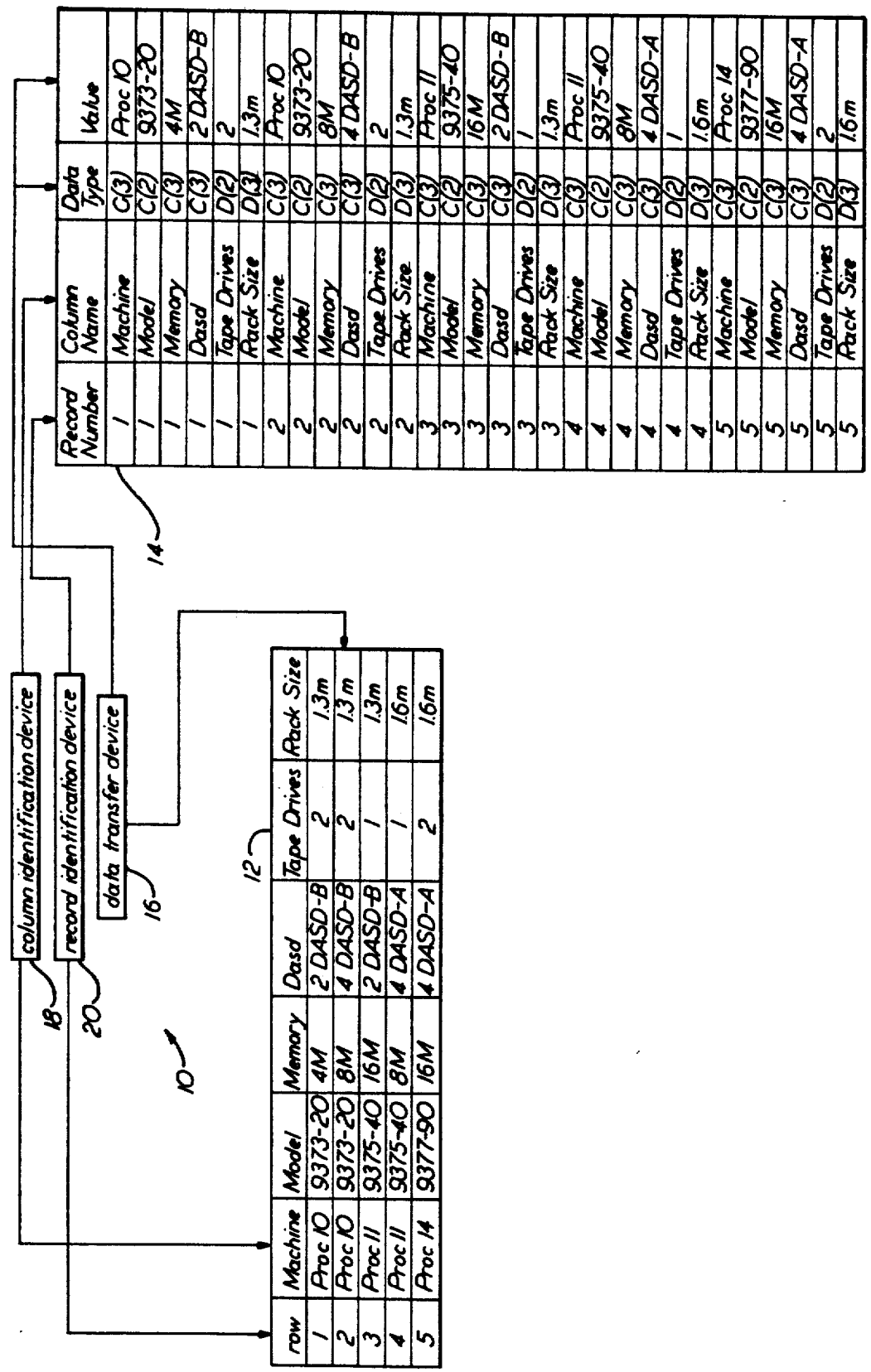
FIG. 1 is a schematic drawing showing two different types of database tables, and a system for transferring data from a first of these tables to the second.
Figure 2:
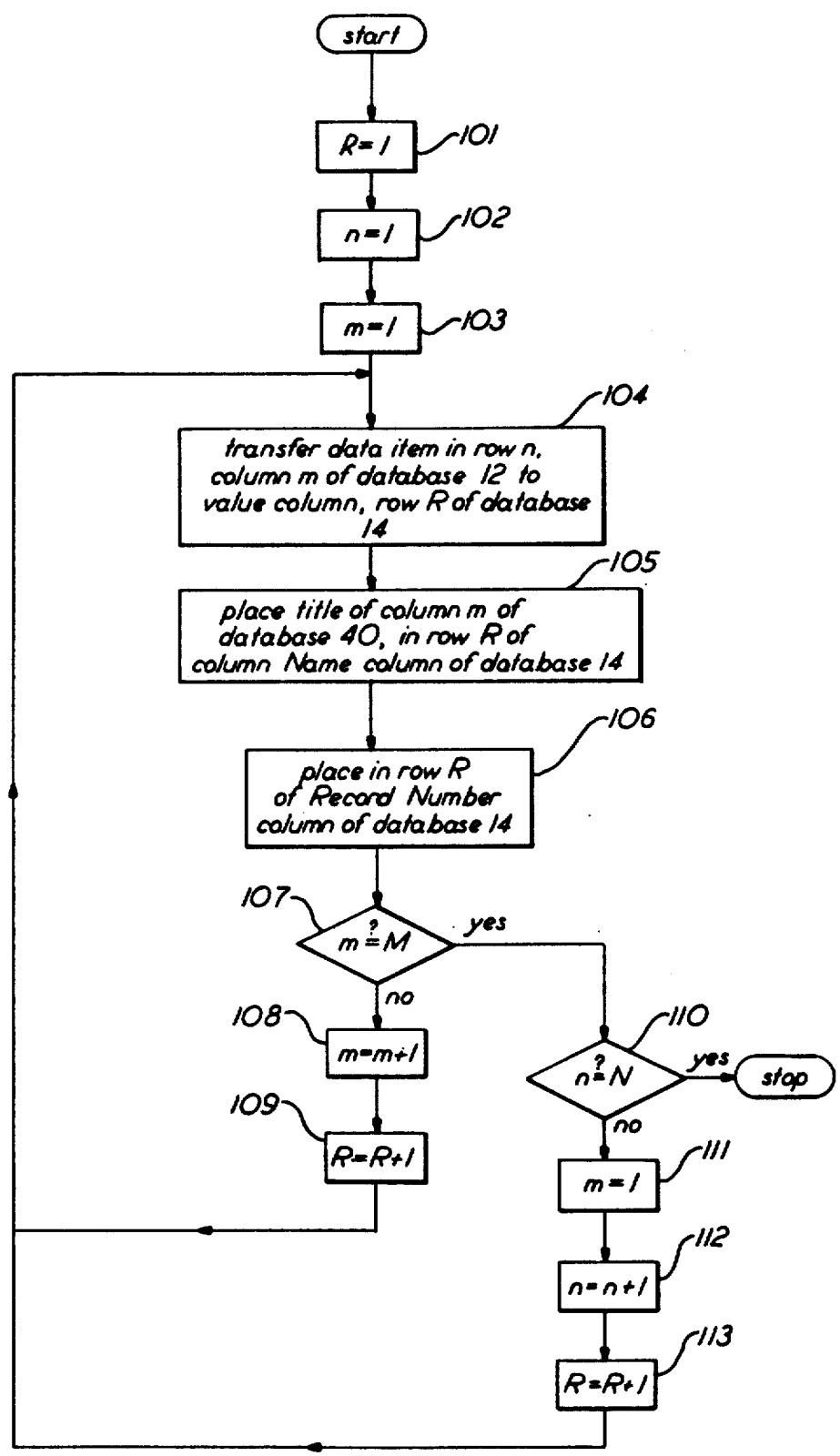
FIG. 2 is a flow chart illustrating a preferred procedure for transferring data from the first to the second of the tables shown in FIG. 1.

With reference to FIGS. 1 and 2, the present invention is a system 10 and a method for transferring data items from a first database table 12 to a second database table 14. First table 12 has a plurality of rows and columns, each column is identified in some way such as by a name, and each row is identified by a unique number. Each row of table 12 comprises a set of data items referred to as a record, and each record in table 12 is uniquely identified by some suitable indicia such as by the number identifying the row of data forming that record. For this reason, the numbers identifying the rows of table 12 are referred to as record numbers. Preferably, the rows of table 12 are consecutively numbered with consecutive integers, starting with 1. Second table 14 has a plurality of rows and at least three, and preferably four, columns; and the columns of database table 14 are designated "Record Number," "Column Name," "Data Type" and "Value."

Data value transfer device or means 16 is provided to transfer each data item in table 12 to the Value column of table 14. Generally, the data in each row of table 12 are transferred to successive rows of the Value column of table 14, and data from successive rows of table 12 are transferred to successive series of rows in the Value column of table 14. For instance, the six data items in the first row of table 12 are transferred to rows 1 through 6, respectively, of the Value column of table 14, and the six data items in the second row of table 12 are transferred to rows 7-12, respectively, of the Value column of table 14. The six data items in the third row of table 12 are transferred to rows 13-18, respectively, of the Value column of table 14, and the remaining data items in table 14 are transferred in an analogous manner to the Value column of table 14.

It is often desirable to represent all of the data items in each individual column of a database table in a single format such as alpha-numeric or numeric. For this reason, as data items are being transferred from table 12 to database table 14, it may be preferred to convert the data items into a code having one format for alpha characters, whole numbers and decimals, and data transfer means 16 may be used to do this. If this is done, the data value transfer means may also be used to identify in each row of the Data Type columns of table 14, the original format in table 12 of the data item stored in the Value column of that row of table 14. For instance, c(3) may be placed in rows 1, 7 and 13 of the Data Type column of table 14 because the data items in rows 1, 7 and 13 of the Value column of table 14 are stored in alphanumeric format in table 12, and D (2) may be placed in rows 5, 11 and 17 of the Data Type column of table 14 because the data item in rows 5, 11 and 13 of the Value Column of database 14 are in numeric format in table 12. In this way, the data items in database table 14 can be converted back into their original code and format if desired, and for example, this may be done to use these data items in a mathematical computation.

Column identification device or means 18 is provided to identify in the Column Name column of each row of table 14, the title or name of the column of table 12 from which the data item in the Value column of that row was taken. For example, the title "Machine" is placed in the Column Name column of the first row of table 14 because the data item, Voy 10, in the Value column of the first row of table 14 is taken from the "Machine" column of table 12; and the title "Model" is placed in the Column Name column of the second row of table 14 because the data item 9373-20, in the Value column of the second row of table 14 is taken from the "Model" column of table 12.

For analogous reasons, the terms "Memory," "Dasd," "Tape Drives" and "Rack Size" are located, respectively, in the third through sixth rows of the Column Name column of table 14. The names "Machine," "Model," "Memory," "Dasd," "Tape Drives" and "Rack Size" are repeated, respectively, in rows 7-12 of the Column Name column of database table 14 because the data items in rows 7-12 of the Value column of table 14 were taken, respectively, from the "Machine," "Model," "Memory," "Dasd," "Tape Drives" and "Rack Size" columns of table 12.

Record identification device or means 20 is provided to identify in the Record Number column of each row of table 14, the number of the row, or record, of table 12 from which the data item in the Value column of that row of table 14 was taken. For instance, the number "1" is placed in each of rows 1-6 of the Record Number column of table 14 because of the data items in rows 1-6 of the Value Column of table 14 is taken from the first row of table 12, and the number "2" is located in each of rows 7-12 of the Record Number column of table 14 because each of the data items in rows 7-12 of the Value Column of table 14 is taken from the second row of table 12. For analogous reasons, the number "3" is located in each of rows 13-18 of the Record Number column of table 14, the number "4" is located in each of rows 19-24 of the Record Number column of this table, and the number "5" is located in each of rows 25-30 of the Record Number column of the table.

With particular reference to FIG. 2, the program outlined therein for transferring data from database table 12 to database table 14 involves three variables, k, n, and m, and two constants, M and N. k is an internal counting variable that keeps track of the number of data items that have been transferred from table 12 to table 14, and m and n are internal variables that identify the column and row, respectively, of a data item in table 12 that is being transferred from that table to table 14. M and N are externally set values equal to the total number of columns and rows, respectively, in table 12.

At steps 101, 102 and 103 in the program represented by FIG. 2, k, n and m are respectively set equal to one, and at step 104 the data item in row n, Column m of table 12 is transferred to row k of the Value column of table 14. If, as this is done, the data item is converted from one code to another, the original type of the data item in table 12, may be identified in the Data Type column of table 14, allowing the data item to be converted back into its original type. Then at step 105, the title of column m of table 12 is placed in row k of the Column Name column of table 14, and at step 106 the number n is placed in row k of the Record Number column of this table. Next, at step 107 m is compared to n, and if m is unequal to M, m and k are increased by one at steps 108 and 109 respectively, and the program loops back to step 104. Steps 104-109 are repeated for successively larger m values until m is equal to M. When this occurs, from step 107, the program moves to step 110, and n is compared to N. If n is unequal to N, m is reset to 1 at step 111, n and k are increased by one at steps 112 and 113 respectively, and the program returns to step 104. Steps 104-109 are repeated, for this new value of n, until the new m becomes equal to n, and when this occurs, n and k are again increased by one and m is again reset to one. This procedure continues until n becomes equal to N; and once this happens, the next time n is compared to N, the program terminates.

With the above-described program, the data items in database table 12 are transferred one row, or record, at a time to database table 14. Within each row in table 12, the data items in successive columns of the row are transferred to successive rows of the Value column of table 14, and the data items in successive rows of table 12 are transferred to successive sets or groups of rows in table 14.

Figure 3:
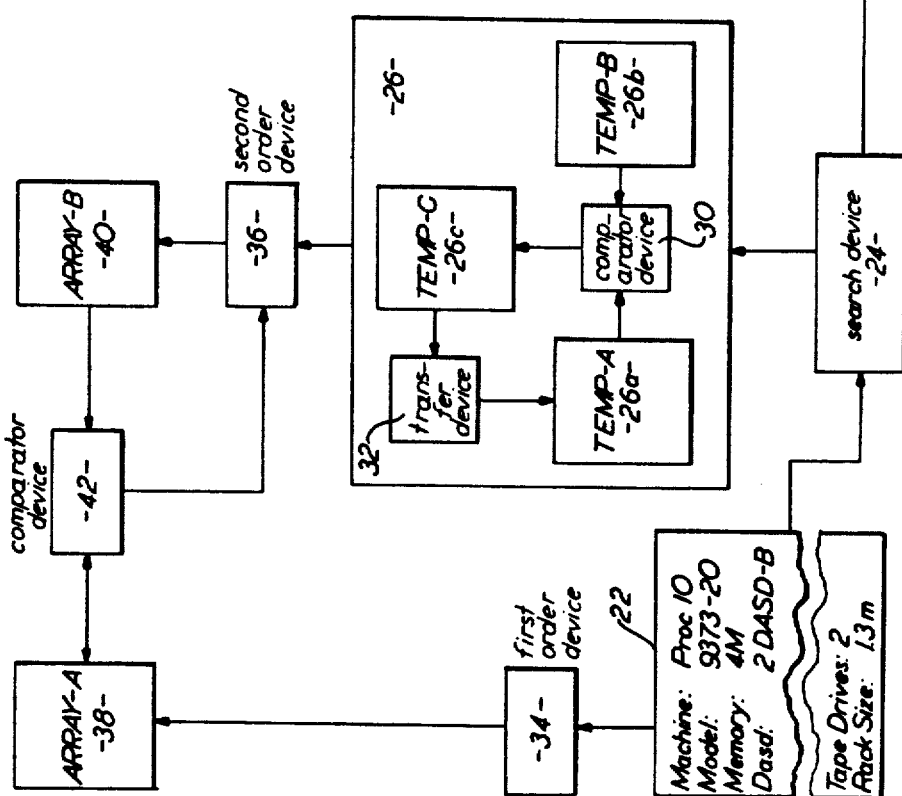
FIG. 3 is a schematic drawing of a system for searching a database table for a given record.

FIG. 3 shows a system for searching database table 14 for a given record. With this system, input means 22 is provided to receive an inquiry having a record, referred to as the given record, which includes a plurality of parameters taken from a given family of parameters and a value for each parameter in the record. It is not necessary, however, that the given record include, all of the parameters in the given family. Search device or means 24 is provided to search table 14 for the numbers of the records having a first of the parameters of the given record and also having the same value for that first parameter as in the given record. If any such records are stored in table 14, search means 24 retrieves the numbers of those records and stores those record numbers in memory 26. For each of the other, or succeeding, parameters of the given record, search means 24 searches through database 14 for the numbers of the records having the other parameter of the given record and the same value for that other parameter as in the given record; and the list of the numbers in memory 26 is modified by deleting from that list, first, the numbers of the records not having the other parameter, and second, the numbers of the records having the other parameter but having a value for that other parameter different than the value of that other parameter in the given record.

This deletion or elimination of some or all of the numbers in memory 26 is achieved by means of memory sections 26a, b and c, referred to as TEMP-A, TEMP-B and TEMP-C respectively. More specifically, the numbers of the records having both the first parameter of the given record and the same value for that parameter as in the given record, are stored in TEMP-A. After database 14 has been searched for all of the records having that first parameter and given value for that parameter, search means 24 then searches through the database for the numbers of the records having a second of the parameters of the given record and also having the same value for that second parameter as in the given record, and these latter record numbers are stored in memory section TEMP-B. After this second search through database 14 has been completed, comparator means 30 compares the numbers in TEMP-A and TEMP-B, and the numbers that are in both TEMP-A and TEMP-B are listed in third memory section TEMP-C. After this, transfer means 32 erases the list in memory section TEMP-A and transfers to that memory section the list formed in the memory section TEMP-C. This procedure is repeated for all of the parameters in the given record up to and including the second last parameter of that record.

For the last parameter in the given record, the above procedure is repeated except that it is not necessary to transfer to TEMP-A the list formed in TEMP-C because, at this point, the list formed in TEMP-C is a complete list of all the records in table 14, if any, having all the parameters in the given record and the respective values for those parameters.

Some, or perhaps all, of these listed records may include parameters not included in the given record; and in order to determine if table 14 includes a record that exactly matches the given record, it is necessary to search the records listed in TEMP-C for records having parameters not in the given record. First and second ordering means 34 and 36, first and second arrays 38 and 40 and comparator means 42 are used to do this.

The first ordering means arranges the parameters of the given record in the first array referred to as ARRAY-A, and according to a given order; the second ordering means arranges the parameters of a first record listed in TEMP-C in the second array, referred to as ARRAY-B, but also according to that same given order, and comparator 42 compares this second array to the first array. If the two arrays are found to be different, then ARRAY-B is erased, the second ordering means arranges the parameters of the next record listed in TEMP-C in a new ARRAY-B, and comparator 42 compares this new ARRAY-B to ARRAY-A. This process is repeated for each of a series of records listed in memory section TEMP-C until either an ARRAY-B is found that is identical to ARRAY-A, or all the records listed in memory section TEMP-C have been searched without finding one that is identical to the given record.

Preferably, ARRAY-A consists of a series of consecutive rows, and the parameters of the given record are arranged in that array in alphabetical order, with one parameter per row; and, similarly, ARRAY-B consists of a series of consecutive rows, and the parameters placed therein are arranged in alphabetical order also with one parameter per row. With this preferred arrangement, the two arrays are compared by comparing the parameters in corresponding rows of the two arrays, and the comparison of ARRAY-A with a particular ARRAY-B is terminated when a parameter in a row in that ARRAY-B is found that is different than the parameter in the same row of ARRAY-A. Also, with this preferred embodiment, the search for a record identical to the given record is itself ended when the parameter of each row of a particular ARRAY-B has been found to be identical to the parameter in the same row of ARRAY-A.

Figure 4:
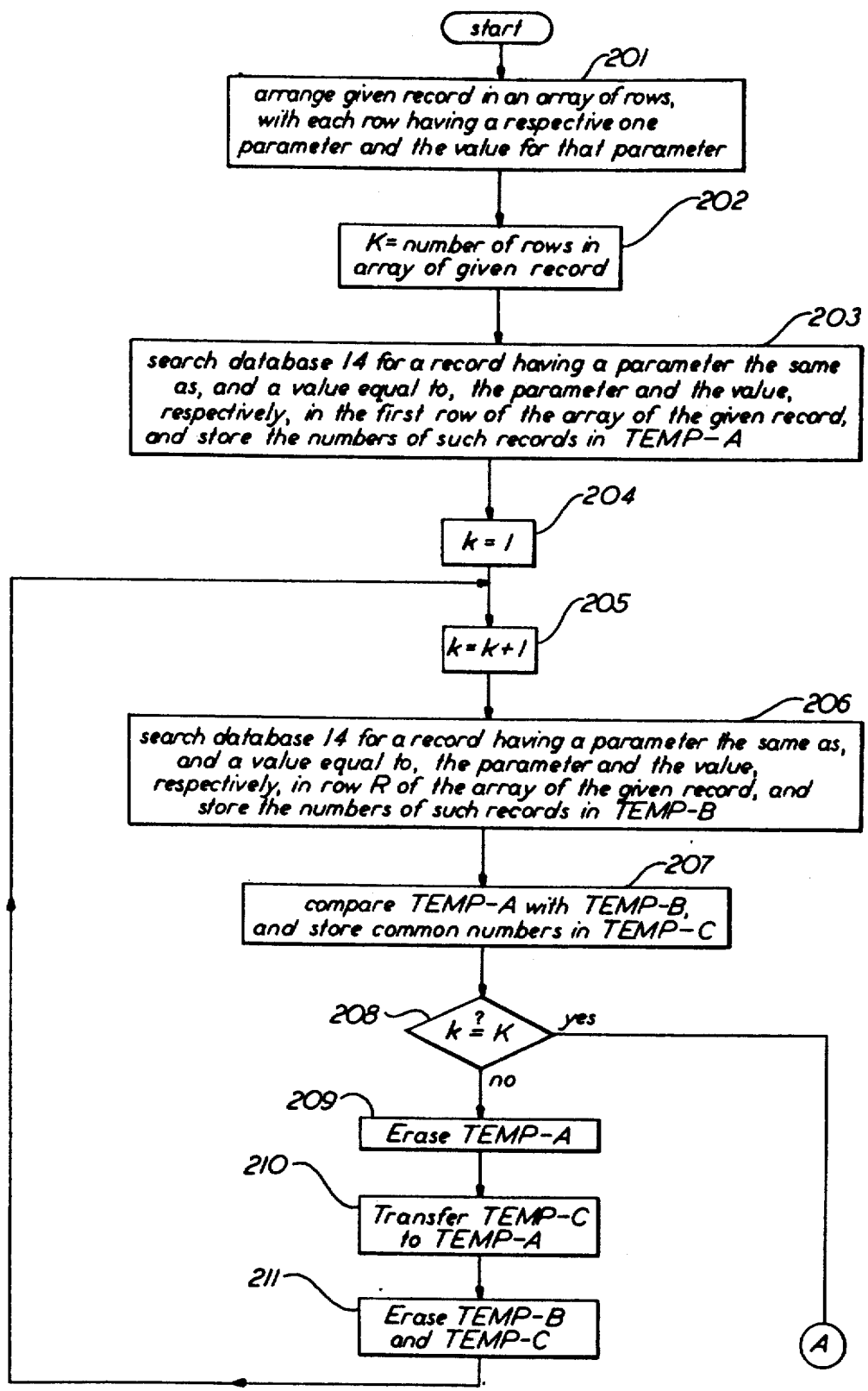
FIGS. 4 and 5 show a flow chart illustrating a procedure to operate the system shown in FIG. 3.

FIG. 4 shows the first half of a flow chart illustrating one procedure for searching database 14 for a record identical to a given record. This half of the flow chart involves two variables, K and k. K is an internal variable set equal to the total number of parameters in the given record, and k is an internal variable that keeps track of the number of those parameters for which database 14 has been searched.

At step 201, the parameters of the given record are arranged in an array of rows, with each row having a respective one parameter and the value for that parameter, for example as shown in FIG. 3; and at step 202, K is set equal to the number of rows in the array. Then, at step 203, table 14 is searched for a record having a parameter the same as, and a value equal to, the parameter and value in the first row of the given record, and the numbers of such records are stored in TEMP-A. Next, at step 204 k is set equal to one, and then at step 205, k is increased by one. At step 206, table 14 is searched for a record having a parameter the same as, and a value equal to, the parameter and the value in row k of the array formed by the given record, and all of these record numbers are stored in TEMP-B.

After this, at step 207, the list in TEMP-B is compared with the list in TEMP-A, and the record numbers that are on both lists are stored in TEMP-C. At step 208, k is compared to K, and if k is not equal to K, the list in TEMP-A is erased at step 209, the list in TEMP-C is transferred to TEMP-A at step 210, and TEMP-B and TEMP-C are erased at step 211 The procedure returns to step 205, and steps 205-210 are repeated until k becomes equal to K. Once k becomes equal to K, steps 206, 207 and 208 are repeated one last time, and then after step 208 the procedure moves to the flow chart shown in FIG. 5. At this point, a first pass through table 14 is completed, and TEMP-C contains a list of all the numbers of records in table 14 having all the parameters, and their respective values, in the given record.

Figure 5:
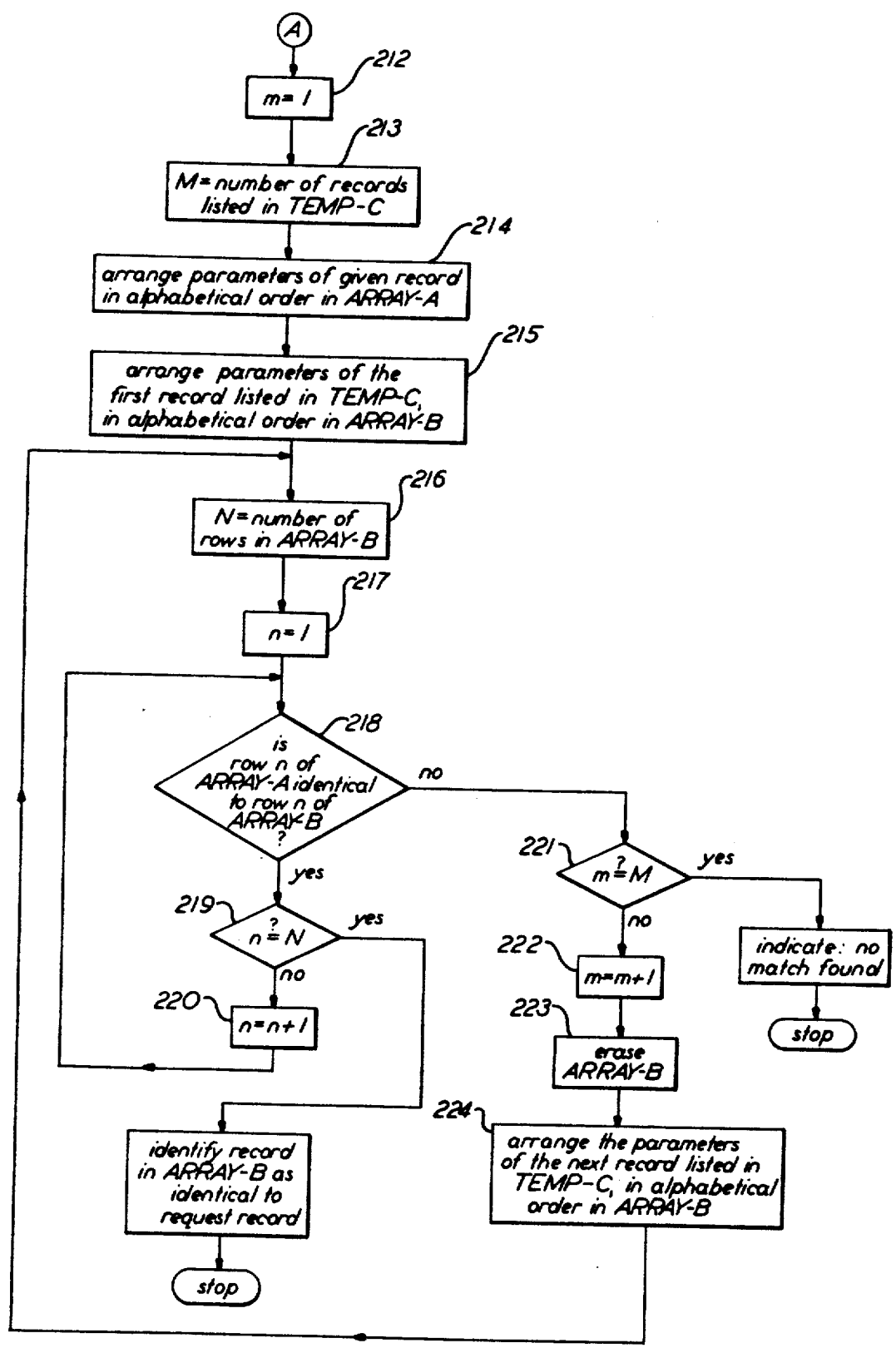

As previously mentioned, many or all of these records listed in TEMP-C may have parameters that are not in the given record set, and FIG. 5 illustrates a procedure to search through the records listed in TEMP-C for an exact match with the given record.

The flow chart shown in FIG. 5 involves four internal variables m, n, M and N. M is set equal to the number of records listed in TEMP-C after the above-mentioned first pass has been completed through table 14, and m keeps track of the number of these records that have been compared to the given record. N is set equal to the total number of parameters in the record listed in TEMP-C that is under consideration at any particular time, and n keeps track of the number of parameters in that record for which the given record has been searched.

At step 212, m is set equal to one, and then at step 213, M is set equal to the number of records listed in TEMP-C. The parameters of the given record, at step 214, are arranged in alphabetical order in an array of rows, identified as Array-A; and at step 215, the parameters of the first record listed in TEMP-C, are arranged in alphabetical order in a second array of rows, referred to as Array-B. N is set equal to the number of rows in Array-B at step 216, and n is set equal to one at step 217. Then, at step 218, row n of Array-A is compared to row n of Array-B. If these two rows are the same, n is compared to N at step 219. If n is not equal to N, then n is increased by one at step 220, and the program loops back to step 218. Steps 218, 219 and 220 are repeated for as long as the rows of Array-A are the same as the rows of Array-B. If n eventually becomes equal to N, this indicates that all the rows of Array-B have been compared to rows in Array-A, and a one-to-one match has been found between the rows of the arrays. The record of table 14 that was used to form that Array-B is identical to the given record, and this record of the table is identified as such.

If, during the comparison of Array-A and Array-B, a parameter in a row of the latter array is found that is different than the parameter in the same row of the former array, then the flow chart illustrated in FIG. 5 moves on to step 221, and m is compared to M. If m is not equal to M, m is increased by one at step 222, Array-B is erased at step 223, and at step 224, the parameters of the next record listed in TEMP-C are now arranged in alphabetical order in Array-B. The program then loops back to step 217, N is reset equal to the number of rows in the new Array-B, n is reset to one, and the program proceeds through steps 217-221 to compare Array-B to Array-A, one row at a time. If at step 221, m is equal to M, this indicates that all the records listed in TEMP-C have been compared to the given record, and no match has been found, and this is indicated to the user.

As will be understood by those of ordinary skill in the art, database table 14 is very well suited to assist a user search for records of indefinite or variable length. The format of table 14 does not require that the same, fixed number of rows be allocated to each record, while in contrast, the format of table 12 requires that the same fixed number of columns be allocated to each record even though many columns might not be used in many records. New records can be continuously added to table 14, and it is not necessary to adjust the column or row length of any previously stored records even if the length of the new record exceeds the length of the longest prior stored record. Moreover, regardless of the number of data items in the records stored in table 14, the database has a fixed number of columns.

Figure 6:
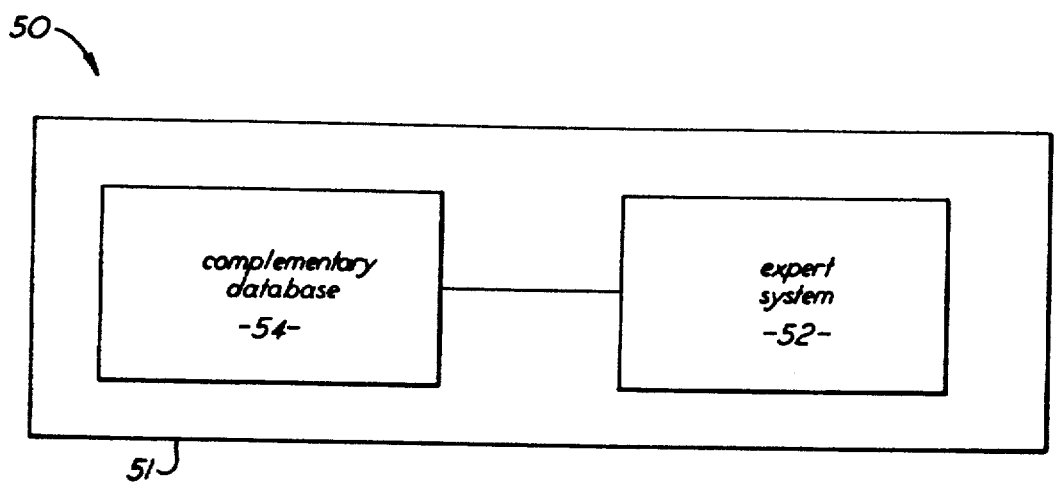
FIG. 6 is a block diagram illustrating a knowledge system that may employ the search procedure of this invention.

Database table 14 is particularly useful to support problem solving in certain expert systems designed to answer requests involving a large number of parameters; and FIG. 6 shows a knowledge system 50 comprising a central processing unit 51 including an expert system 52 and a complementary database 54, which preferably includes database table 14. Generally, the knowledge system is provided to answer requests, and each request has a record including a plurality of parameters, taken from a given family of parameters, and values for those plurality of parameters. The expert system is provided to process the record of a specific request, according to a given program, to provide an answer to that request, and the complementary data base stores a plurality of records of requests having known answers, and any request from a user is preprocessed by searching the complementary data base for a record identical to the record of the request. If an identical record is found in the complementary database, the known answer to the request having that identical record is given to the user to answer his or her request, eliminating the need to invoke the expert system to process the user request, with concomitant savings in time and cost. However, if no identical record is found in the complementary database, the expert system is invoked to answer the request.

Preferably, complementary database 54 has the capacity to be continuously updated by adding new records to it from the expert system 52. With this capability, if a request is made having a particular record that is not found in the complementary database, and the expert system is invoked to answer the request, then a record of this answer, which may or may not be identical to the request record, may be added to the complementary database. In this way, if a later request is made having a record the same as that of the added record, it is not necessary to invoke the expert system to answer the request.

For example, system 50 may be used to determine whether a requested machine configuration is valid—that is, the machine configuration can be built without violating any of certain rules or limitations set by the manufacturer. In this case, the given family of parameters may include all the available types of features and options, as well as a parameter to identify a basic machine name or number and a parameter to identify a basic model name or number, and the value for a parameter is a specific choice or selection relating to that parameter. The record for a particular request includes a machine name or number, a model name or identical to one of these stored records, the fact that an identical record is stored in the complementary database indicates that the requested machine or system configuration is available, and it is not necessary to invoke the expert system to process the request. With the capacity to continuously update the complementary database, if a request is made for a machine configuration, and the record for that configuration is not in the complementary database but the expert system successfully computes a configuration from that request, then the record for this computed machine configuration can be added to the complementary database, eliminating any need to use the expert system again to compute that configuration.

Even more specifically, system 10 may be used to configure a particular IBM 9370 computer system, and in this event, the parameters of a machine record might include terms or phrases such as machine, model, memory size, direct access storage device (Dasd), tape drives, and rack size. Four types of machines are available: the Processor 10, the Processor 11, the Processor 12 and the Processor 14; and each of these machines is available in one model—the Processor 10 is available in model No. 9373-20, the Processor 11 is available in model No. 9375-40, the Processor 12 is available in model No. 9375-60, and the Processor 14 is available in model No. 9377-90. Three memory sizes are available: 4 Megabytes, 8 megabytes, and 16 megabytes; two types of direct access storage devices are available: DASD-A and DASD-B; and two different sizes of racks are available: 1.6 m. and 1.3 m.

A record for a 9370 computer system might include the following data:

| Machine: | Proc 10 |
|---|---|
| Model: | 9373 |
| Memory: | 8MB |
| Dasd-A | 2 |
| DASD-B | 13 |
| . | . |
| . | . |
| . | . |
| Tape drives: | 2 |
| Rack size | 1.6 m |

The complete records of several popular or standard system configurations may be stored in the complementary database; and when a request is made having a record identical to one of these stored records, the fact that an identical record is stored in the complementary database indicates that the requested machine or system configuration is valid, and it is not necessary to invoke the expert system to process the request. With the capacity to continuously update the complementary database, if a request is made for a machine configuration, and the record for that configuration is not in the complementary database but the expert system successfully computes a configuration from that request, then the record for this computed machine configuration can be added to the complementary database, eliminating any need to use the expert system again to compute that configuration.

Figure 7:
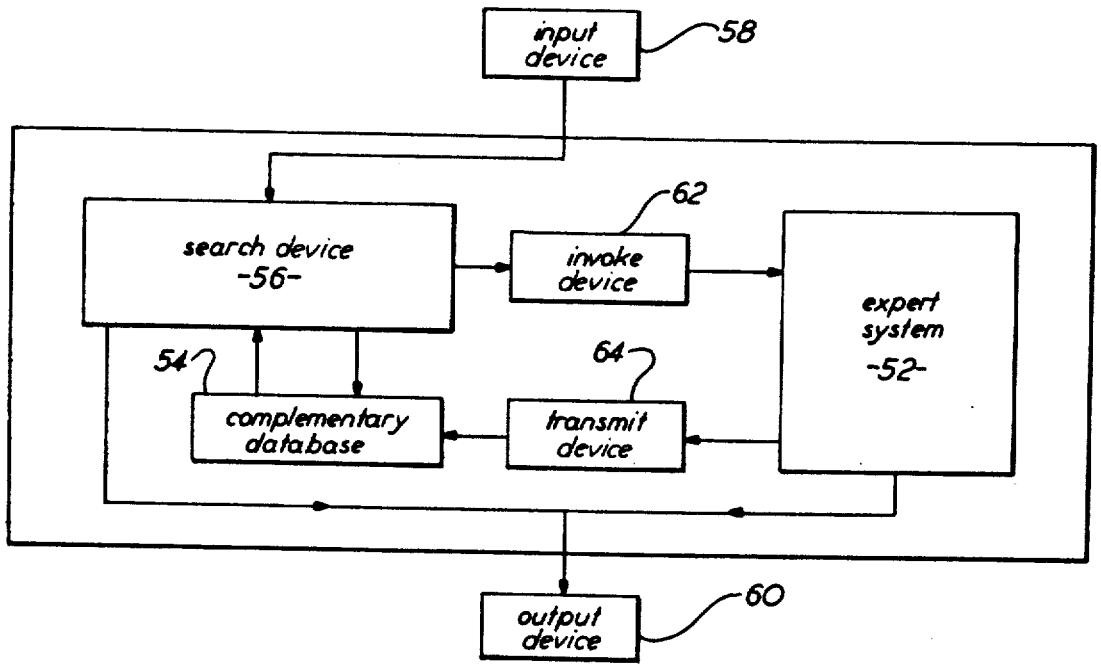
FIG. 7 is a more detailed block diagram of the knowledge system.

FIG. 7 illustrates knowledge system 50 in greater detail; and, as shown therein, the system further includes search device or means 56, input device or means 58, output device or means 60, invoke device or means 62 and transmit device or means 64. The search means is connected to the complementary database to search that database for a record identical to the record of a request, and if such an identical record is found, to provide an answer to the request. The input means is connected to the search means and is provided to receive from a user, the record of a request and to transmit that record to the search means. The output means is connected both to the search means and to the expert system to receive the answer to a request, either from the search means or from the expert system and to convey that answer to the requester.

The invoke means is connected to the search means and to the expert system to invoke that expert system to process the record of a request whenever, and preferably only when, no identical record has been found in the complementary database. The transmit means is connected to the complementary database and to the expert system, and the transmit means is used to transmit to the complementary database for storage therein, all or selected records that have been processed or produced by the expert system.

Figure 8:
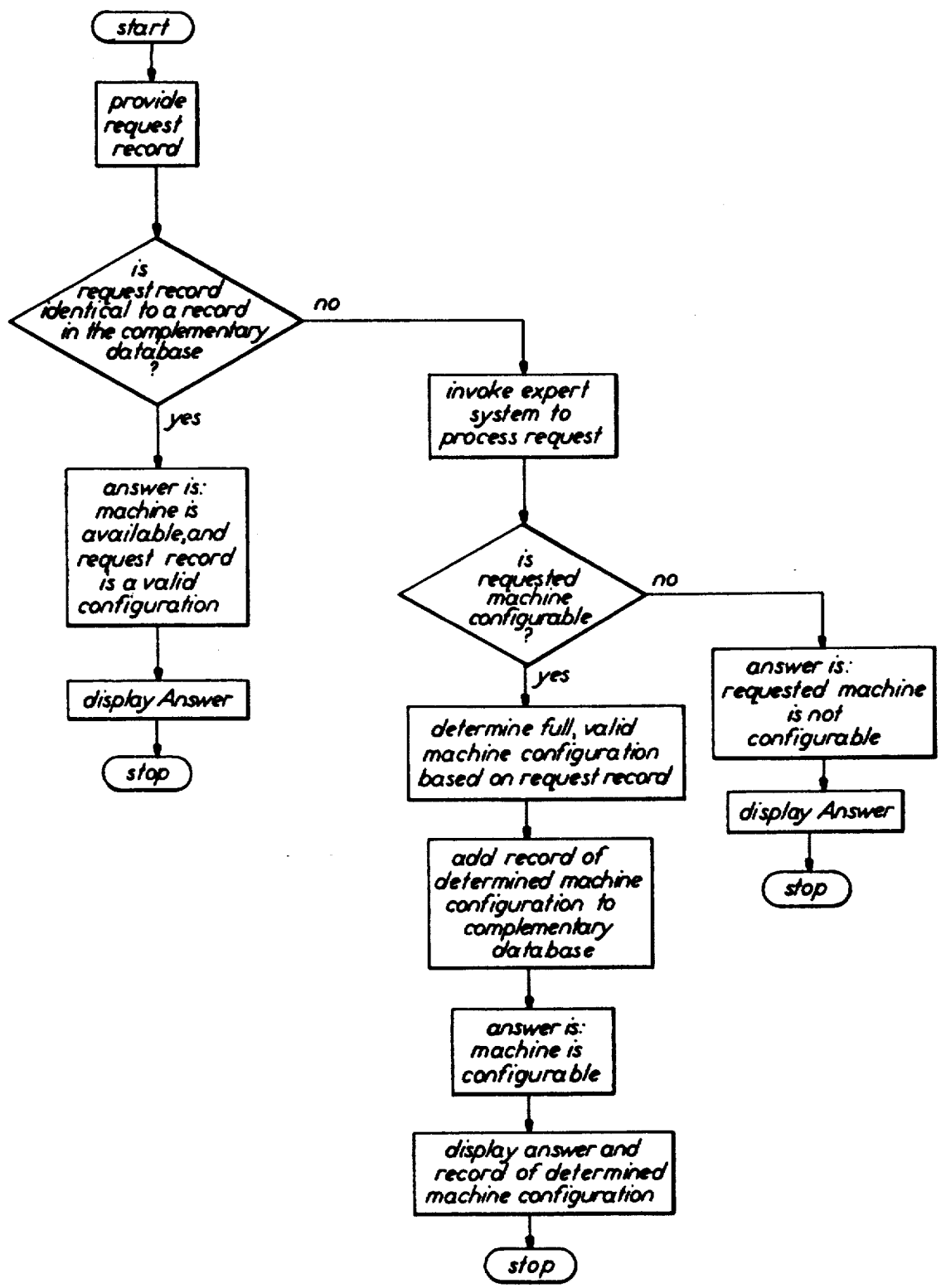
FIG. 8 is a simplified flow chart showing one process for operating the knowledge system of FIG. 7.

FIG. 8 is a flow chart illustrating one procedure for operating system 50. With this procedure, the record for a requested machine configuration is provided, and the complementary database is searched for an identical record. If such an identical record is found, the answer to the inquiry is that the requested machine configuration is valid, and this answer is conveyed to the requester. If the identical record is not found in the complementary database, the expert system is invoked to compute a full, valid machine configuration based on the requested configuration. If the requested configuration is computable, this answer is conveyed to the requestor, and the record of the computed configuration, which might be the same or different than the requested machine configuration, is added to the complementary database. If the request is not configurable, this answer is conveyed to the requestor.

Figure 9:
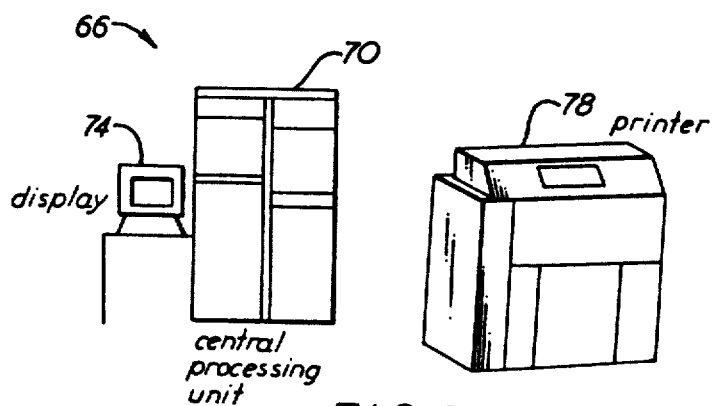
FIG. 9 shows a computer system that may be used as the knowledge system.

FIG. 9 illustrates a computer system 66 that may be used to practice knowledge system 50. The computer is of conventional construction and has a central processing unit 70 including a processor and a random access memory along with one or more disc or tape drives for receiving computer programs and data to be executed and processed by the processor. To run a program, for example, a tape may be mounted on the main unit 70. In order for the user to interact with the computer while a program is being run, the computer includes a cathode ray tube display 74 for showing the user intermediate results and prompting the user for data to be entered via suitable input means. A printer 78 is also provided to produce a permanent record or listing of data when a computer program is run. A portion of the memory of the computer may house the complementary database 54. Alternatively, the complementary database may comprise a separate data storage unit, located inside or outside of the computer.

As previously mentioned, knowledge system 50 may be used with an expert system specifically designed to determine particular machine configurations, and any suitable such system may be used with the knowledge system. One system used by IBM to compute particular configurations of the IBM 9370 Information Systems available is known as the HP+CS—the Hardware Placement and Connection System—which is part of a larger system, referred to as HONE, that is also used to track and process order requests. Furthermore, those of ordinary skill in the art will recognize that many other types of expert systems may also be employed with knowledge system 10. For example, U.S. Pat. No. 4,658,370 discloses an expert system that gives car repair advice, and U.S. Pat. No. 4,648,044 discloses an expert system for selecting wines, and knowledge system 50 may be effectively employed with both of these expert systems.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. In a computer system comprising a central processing unit, input-output means connected to the central processing unit, and memory means containing a database table having a plurality of records, each record being identified by a unique record number and including a plurality of parameters taken from a given family of parameters, and a value for each parameter in the record, a method of searching the database comprising the steps of:

inputting a given record to the central processing unit from the input-output means, the given record including a plurality of parameters taken from the given family of parameters, and a value for each parameter in the given record; and the central processing unit searching the database for a record therein identical to the given record, and including the steps of (a) searching the database table for, and storing in a memory list in the memory means, the numbers of all of the records having the first of the parameters of the given record and the same value for said first parameter as in the given record, (b) for each of the other parameters of the given record, deleting from the memory list (1) the numbers of the records not having the other parameter, and (2) the numbers of the records having the other parameter but having a value for said other parameter different than the value for the other parameter in the given record, and (c) comparing the parameters of the records listed in the memory list to the parameters of the given record to search for a record in the memory list having only the parameters in the given record, and when such a record is found, identifying such record at the input-output means as identical to the given record.

2. A method according to claim 1, wherein:

step (a) includes the step of (d) compiling in a first section of the memory means, a list of all the numbers of the records in the database table having the first parameter of the given record and the same value for said first parameter as in the given record; and for each of the other parameters of the given record, step (b) includes the steps of (e) compiling in a second section of the memory means, a list of all the numbers of the records having the other parameter of the given record and the same value for said other parameter as in the given record, and (f) compiling in a third section of the memory means, a list of all the numbers listed in both the first and second memory sections.

3. A method according to claim 2, wherein for each of the other parameters of the given record up to a second last parameter thereof, step (b) further includes the step of (g) after steps (e) and (f), erasing the list in the first section of the memory means and then transferring to the first section of the memory means the list in the third section of the memory means.

4. A method according to claim 1, wherein step (c) includes the steps of:

(h) arranging the parameters of the given record in a first array and according to a given order; and for each of a series of records listed in the memory list, (i) arranging the parameters of the record in a second, temporary array and according to the given order, (j) comparing the second array to the first array, and (k) terminating steps (i) and (j) when a second array is found that is identical to the first array.

5. A method according to claim 4, wherein:

step (h) includes the step of arranging the parameters of the given record in a first array of consecutive rows;

step (i) includes the step of arranging the parameters of the record in a second array of consecutive rows;

step (j) includes the step of, for each of a series of rows in the second array, comparing the parameter in the row of the second array with the parameter in the same row of the first array; and step (k) includes the step of terminating step (j) when a parameter in a row in the second array is found that is different than the parameter in the same row of the first array.

6. A method according to claim 5, wherein step (k) further includes the step of terminating steps (i) and (j) when, for each row in the second array, the parameter in the row of the second array has been found to be identical to the parameter in the same row of the first array.

7. A computer system for searching a database table for a given record, the computer system comprising:

memory means containing the database table, said table including a plurality of records, each record of the data base table being identified by a unique record number and having a plurality of parameters taken from a given family of parameters, and a value for each parameter in the record;

a central processing unit; and input-output means connected to the central processing unit to transmit the given record thereto, the given record including a plurality of parameters taken from the given family of parameters, and a value for each parameter in the given record;

the central processing unit including search means connected to the memory means to search the database table for records having (i) at least all of the parameters in the given record and (ii) the respective values for said parameters as in the given record, and to form in the memory means a list of the numbers of all of the records in the database having at least all of the parameters in the given record and the respective values for said parameters as in the given record, and record comparator means connected to the memory means to compare the parameters of the records in said list to the parameters of the given record to search for a record in said list having only the parameters in the given record.

8. A system according to claim 7, wherein:

the memory means includes a first section to hold a first list of all of the numbers of records in the database table having a first parameter of the given record and the same value for said first parameter as in the given record, and a second section to hold a second list of all of the numbers of records in the database table having a second parameter of the given record and the same value for said second parameter as in the given record;

the search means includes list comparison means connected to the first and second sections of the memory means to compare the first lift with the second list, and to form a third list of the numbers on both the first and second lists; and the memory means further includes a third section connected to the list comparison means to hold the third list.

9. A system according to claim 11, wherein the record comparator means includes:

first ordering means to arrange the parameters of the given record in alphabetical order in a first array of rows;

second ordering means to arrange the parameters of each of the records listed in the third section of the memory means, one record at a time, in alphabetical order in a second arrow of rows; and array comparison means connected to the first and second ordering means to compare the parameter in each row of the second array, one row at a time, to the parameter in the same row of the first array.

* * * * *

UNITED STATES PATENT AND TRADEMARK OFFICE
CERTIFICATE OF CORRECTION

PATENT NO. : 5,072,367

DATED : December 10, 1991

INVENTOR(S) : Neil H. Clayton, et al.

It is certified that error appears in the above-identified patent and that said Letters Patent is hereby corrected as shown below:

Column 5, line 4: "because of" should read as --because each of--

Column 5, line 68: "include, all" should read as --include all--

Column 11, line 14: "same or" should read as --same as or--

Column 14, line 36, Claim 9: "arrow" should read as --array--

Signed and Sealed this

Sixth Day of April, 1993

*Attest:*

STEPHEN G. KUNIN

*Attesting Officer*      *Acting Commissioner of Patents and Trademarks*